United States Patent [19]

Meyer et al.

[11] Patent Number: 4,469,217
[45] Date of Patent: Sep. 4, 1984

[54] APPARATUS FOR TRANSPORT OF CAPSULES AND THE LIKE

[75] Inventors: Günter Meyer, -Rot am See-Brettheim; Ingbert Pennekamp, Crailsheim, both of Fed. Rep. of Germany

[73] Assignee: Robert Bosch GmbH, Stuttgart, Fed. Rep. of Germany

[21] Appl. No.: 97,629

[22] Filed: Nov. 27, 1979

Related U.S. Application Data

[63] Continuation of Ser. No. 941,618, Sep. 12, 1978, abandoned, which is a continuation-in-part of Ser. No. 767,869, Feb. 11, 1977, abandoned.

[30] Foreign Application Priority Data

Feb. 13, 1976 [DE] Fed. Rep. of Germany ....... 2605775

[51] Int. Cl.³ .............................................. B65G 47/26
[52] U.S. Cl. ...................................... 198/425; 198/478
[58] Field of Search ................................ 198/425–427, 198/433, 441, 461, 478, 480, 481, 792, 803, 475

[56] References Cited

U.S. PATENT DOCUMENTS

| | | | |
|---|---|---|---|
| 1,775,381 | 9/1930 | Angus | 198/478 |
| 2,362,132 | 11/1944 | Haub | 198/478 |
| 2,775,335 | 12/1956 | Simpson | 198/475 |
| 3,952,865 | 4/1976 | Rudszinat et al. | 198/792 |
| 4,003,461 | 1/1977 | Speaker et al. | 198/792 |
| 4,164,997 | 8/1979 | Mueller | 198/792 |

Primary Examiner—Joseph E. Valenza
Attorney, Agent, or Firm—Edwin E. Greigg

[57] ABSTRACT

A conveyor apparatus for handling small capsules, ampules, etc. and for transferring them from a continuous stream to a cyclically moving conveyor rack. Segmented pivoting arms hold the capsules in peripheral recesses. The arms are guided in a cam track whereby their pivotal motion takes place at varying speeds which can be adapted to the requirements of the transfer process and of the subsequent machine members.

1 Claim, 4 Drawing Figures

APPARATUS FOR TRANSPORT OF CAPSULES AND THE LIKE

This is a continuation of application Ser. No. 941,618, filed Sept. 12, 1978 now abandoned which is a C-I-P of application Ser. No. 767,869 now abandoned filed Feb. 11, 1977.

BACKGROUND OF THE INVENTION

The invention relates to an apparatus for conveying and transferring capsules or the like continuously to further conveyors for cyclic displacement.

During the processing and in particular during the transport of capsules and like objects which have very small or unsuitable surfaces for standing upright, it becomes a problem to so transport and guide the individual objects as to hold them securely and prevent their tilting, falling, etc. This purpose is served in general by so-called conveyor racks which are used to supply capsules or ampules, or the like, cyclically to different processing stations of the machine and to transport them through the machines. Generally speaking, the capsules, ampules, or the like, are first supplied as a random flow in a conveyor chute or a turntable or a collecting disc.

In a known apparatus described in German No. GM 72 21 459, the apparatus includes a reciprocating intermediate transport device which is pushed into the flow of objects lying on a turntable and which has outwardly opened recesses, cells or the like for receiving the ampules or similar objects. The intermediate transport device hands over the ampules to conveyor racks which effect their further transport. An apparatus of this type is useful, however, only for the cyclic supply and processing of capsules. When it is desired to employ a continuous transfer of capsules or ampules, a device of this type cannot be used.

OBJECT AND SUMMARY OF THE INVENTION

It is a principal object of the invention to provide a conveyor mechanism for ampules, capsules, or the like, for either of two methods of operation, namely, firstly a continuous supply and a cyclic further transport or the reverse of these sequences.

This object is attained according to the invention by providing an apparatus having one or more rotating transport members, shaped substantially as segments of a circle, having peripheral recesses for receiving ampules or the like. The rotary motion of the segment-like transport members is preferably effected by cam-like devices.

One of the advantages deriving from this invention is an increase in the performance when ampules or the like are continuously supplied to a cyclically operating machine. Other advantages derive from the reliability, the lack of operating noise and the careful handling of the objects. Furthermore, the cam control of the displacement of the transport members permits a simple adaptation to different operating speeds of the subsequent machine.

The invention will be better understood as well as further objects and advantages thereof become more apparent from the ensuing detailed description of a preferred embodiment taken in conjunction with the drawing.

DESCRIPTION OF THE PREFERRED EMBODIMENT

Figure 1:
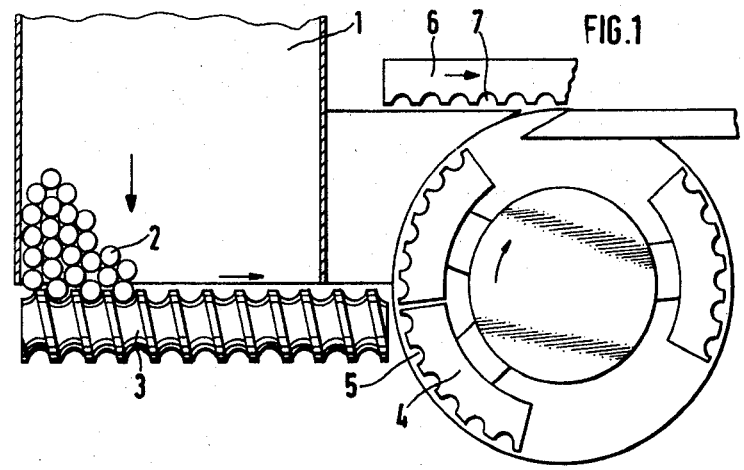
FIG. 1 is a side view of an apparatus of the invention.

Turning now to FIG. 1, there will be seen a supply hopper or chute 1 containing ampules or capsules 2, or the like, as a randomly oriented flow supplying the former to a conveyor helix 3. The helix 3 singularizes the objects contained in the chute 1 and transports them to rotating transport members 4, each substantially resembling the segment of a circle. The transport members 4 have peripheral depressions or recesses 5 each suitable for receiving one of the capsules 2. The segment-like transport members 4 are moved continuously past the point of supply of the conveyor helix 3 so that each of the depressions 5 in the segment-like transport members receives a capsule 2 during its passage. The apparatus further includes a cam controlled drive mechanism which displaces the segment-like transport members in a pivotal manner but at rates which are adaptable to the speed of a suitable transport mechanism such as a conveyor rack 6 in order that capsules 2 may be transferred from the depressions 5 in the members 4 to corresponding depressions 7 in the conveyor rack 6. The conveyor rack 6 further transports the capsules to subsequent processing stations, not further described or illustrated since these are well known in the art.

Figure 2:
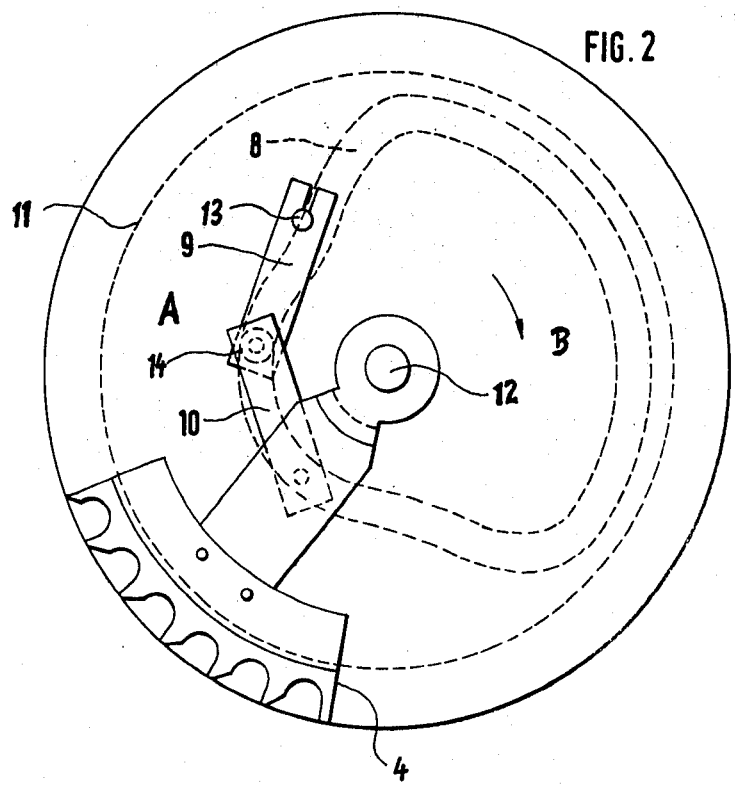
FIG. 2 is a plan view of the cam control drive for the segment-like individual transport members.
Figure 3:
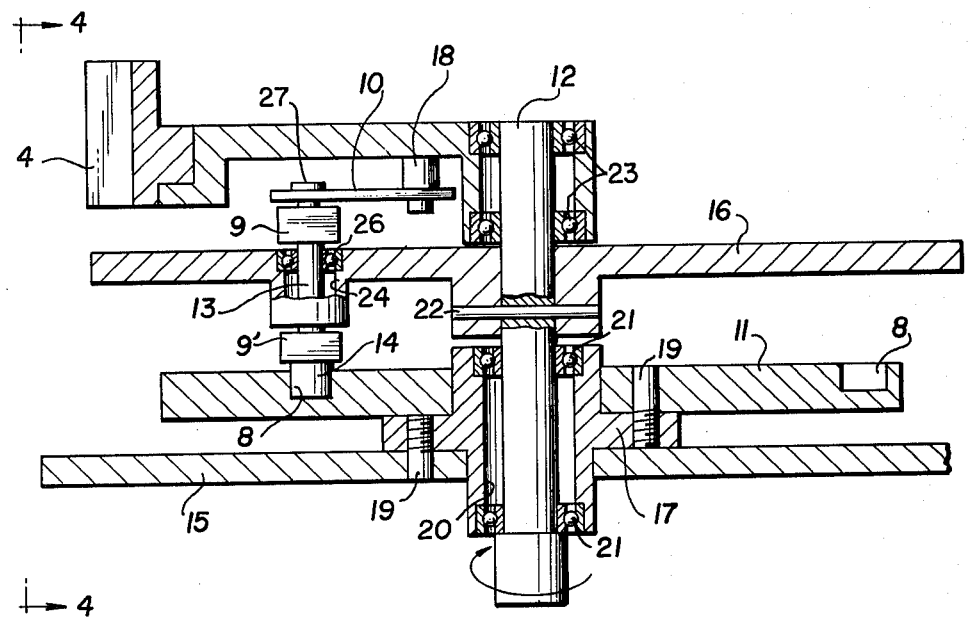
FIG. 3 is a sectional view of the cam control drive of FIG. 2.
Figure 4:
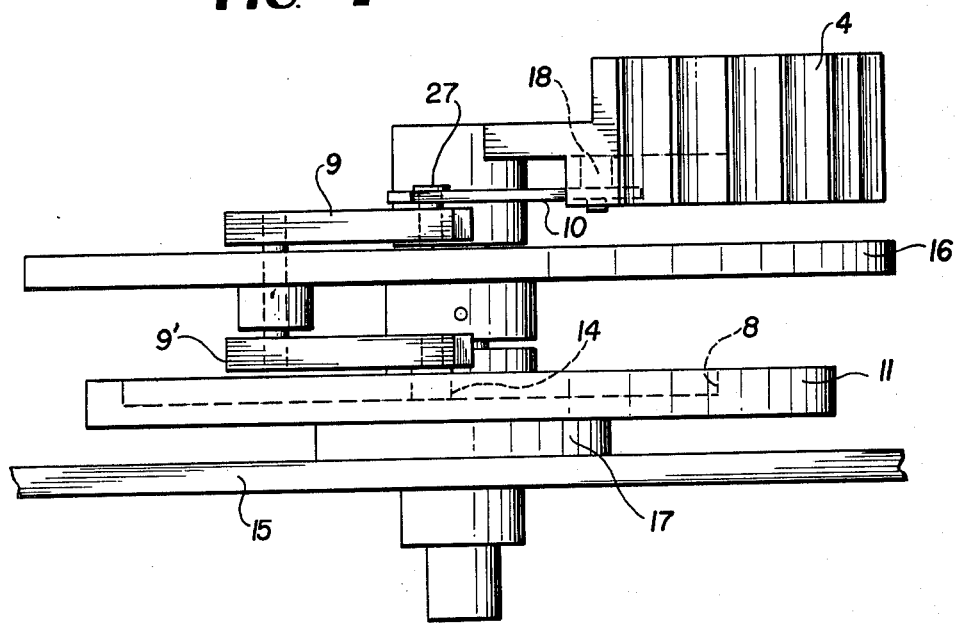
FIG. 4 is a side view of the cam control drive of FIG. 3.

As shown in FIGS. 2, 4, the motion of the segmental transport members 4 is controlled by an undulating cam track 8 formed in the upper surface of a cam plate 11. The cam plate 11 is mounted on a housing plate 15 by means of a flange 17, the housing plate 15, flange 7 and cam plate 11 secured together by means of screws 19. The flange 17 includes a central bore 20 through which extends a shaft 12 mounted in bearings 21 and rotated by suitable means (not shown) in the direction of the arrow. A drive disc 16 is secured to the shaft 12 by means of a pin 22 for rotation therewith and the segment-like transport members 4 are mounted at their inner ends for free rotation on the upper end of the shaft 12 by means of bearings 23. The disc 16 is provided with a bore 24 in which a pin 13 is rotatably mounted on bearings 26 with the upper end lower end portions of the pin 13 projecting above and below the upper and lower surfaces respectively of the disc 16.

As shown best in FIG. 4, the lower end portion of the pin 13 is fixedly attached to one end of a lever 9' on the other end of which is provided a freely rotatable cam follower 14. The cam follower is arranged to be moved along the cam groove 8 in the cam plate 11.

A lever 9, coextensive with lever 9', is fixed at one end to the upper end portion of the pin 13. The other end of lever 9 is pivotally attached to one end of a lever 10 by means of pivot pin 27, the other end of which is pivotally attached to an attachment member 18 mounted on the underside of the transport member 4 radially outward of the shaft 12.

The pivotally mounted transport members 4 are controlled in the corresponding manner by the cam follower 14 and levers 9, 9' and 10. In this manner, the transport members 4 acquire a deceleration or acceleration as required so that the transfer of the capsules 2 takes place at the speed necessary for the prevailing machine speed. The cam track 8 can be so embodied, however, that the transport members 4 are arrested in specified regions of their rotation so that capsules may be inserted or removed while the transport members 4 are stationary. A second lever 9' identical to lever 9 and vertically aligned therewith connects the pin 13 and the cam follower roller 14.

In an embodiment which varies from that illustrated in the drawing, the transport members 4 may also be driven by means of geared quadrants or slotted levers.

The operation of the cam-track drive illustrated in FIG. 2 is as follows:

The cam track 8 of varying curvature and location is defined within the cam plate 11 as shown in FIG. 2. Rotating of the shaft 12 rotates the disc 16 moving the follower 14 in the track 8 through the pin 13 and lever 9'. As the follower 14 moves along the track 8, radial movement of the follower 14 resulting from the undulations in the track swings lever 9' accordingly with corresponding swinging movement of lever 9 as the pin 13 to which the levers 9, 9' are connected oscillates. Such swinging movement of lever 9 is transmitted to the transport member through lever 10 thereby increasing and decreasing the angular velocity of the transport member accordingly. Thus it will be appreciated that the pivotal speed of the member 4 varies during the rotation of the disc 16 depending on the configuration of the track 8, being relatively slower than the angular speed of the disc 16 in a region marked A and being relatively faster than that speed in a region marked B.

The above described apparatus which has been described with respect to the transfer of continuously supplied capsules 2 to a cyclically actuated conveyor rack 6 is also suitable, of course, for the inverse case, i.e., that of the transfer of cyclically supplied capsules to a continuously operating further transport mechanism.

In addition, the helix 3 may be replaced by a conveyor chain or a roller.

The foregoing relates to merely preferred embodiments of the invention and various other embodiments are possible within the spirit and scope of the invention, the latter being defined by the appended claims.

What is claimed is:

1. A conveyor apparatus for transporting ampules or the like comprising:
    first screw conveyor means for continuously transporting individual ampules in sequence;
    first conveyor means;
    second conveyor means fed by said first screw conveyor means for transporting a predetermined number of said ampules simultaneously to said first conveyor means, said second conveyor means including:
    at least one transport member disposed to pivot about a point and having a periphery with a plurality of recesses therein each for receiving and holding one only of the ampules transferred from said first screw conveyor means; and
    drive means for imparting variable speed rotary motion to said transport member, said drive means includes a stationary cam plate having a track defined therein and a cam follower coupled to said at least one transport member, said cam follower being constrained to follow said track, said transport member is coupled to said cam follower by a lever and wherein a further lever is arranged to pivot about the center of said cam follower, a disc positioned to rotate coaxially relative to said cam plate and one end of said further lever is pivotally attached to said disc; whereby, during rotation of said disc, said transport member is constrained to pivot about said point and its angular speed is varied according to the configuration of said cam track.

* * * * *